(12) United States Patent
Vincent et al.

(10) Patent No.: US 9,996,857 B2
(45) Date of Patent: Jun. 12, 2018

(54) SYSTEMS AND METHODS FOR VARIABLE DATA PUBLICATION

(71) Applicant: Dow Jones & Company, Inc., New York, NY (US)

(72) Inventors: Joseph B. Vincent, East Hill, NY (US); Larry L. Hoffman, Bloomingburg, NY (US); Paul L. Cousineau, Roosevelt, NJ (US)

(73) Assignee: DOW JONES & COMPANY, INC., New York, NY (US)

( * ) Notice: Subject to any disclaimer, the term of this patent is extended or adjusted under 35 U.S.C. 154(b) by 0 days. days.

(21) Appl. No.: 14/660,228

(22) Filed: Mar. 17, 2015

(65) Prior Publication Data

US 2016/0275047 A1 Sep. 22, 2016

(51) Int. Cl.
*G06Q 30/02* (2012.01)
*G06F 3/12* (2006.01)

(52) U.S. Cl.
CPC ....... *G06Q 30/0269* (2013.01); *G06F 3/1206* (2013.01); *G06F 3/1243* (2013.01); *G06F 3/1252* (2013.01); *G06F 3/1282* (2013.01); *Y02D 10/1592* (2018.01)

(58) Field of Classification Search
USPC .......................................................... 358/1.6
See application file for complete search history.

(56) References Cited

U.S. PATENT DOCUMENTS

| | | |
|---|---|---|
| 6,188,415 B1 | 2/2001 | Silverbrook |
| 6,209,989 B1 | 4/2001 | Silverbrook |
| 6,213,588 B1 | 4/2001 | Silverbrook |
| 6,213,589 B1 | 4/2001 | Silverbrook |
| 6,217,153 B1 | 4/2001 | Silverbrook |
| 6,220,694 B1 | 4/2001 | Silverbrook |
| 6,227,652 B1 | 5/2001 | Silverbrook |
| 6,227,653 B1 | 5/2001 | Silverbrook |
| 6,227,654 B1 | 5/2001 | Silverbrook |
| 6,231,163 B1 | 5/2001 | Silverbrook |
| 6,234,609 B1 | 5/2001 | Silverbrook |
| 6,234,610 B1 | 5/2001 | Silverbrook |
| 6,234,611 B1 | 5/2001 | Silverbrook |
| 6,238,040 B1 | 5/2001 | Silverbrook |
| 6,239,821 B1 | 5/2001 | Silverbrook |
| 6,241,342 B1 | 6/2001 | Silverbrook |
| 6,243,113 B1 | 6/2001 | Silverbrook |
| 6,244,691 B1 | 6/2001 | Silverbrook |
| 6,247,790 B1 | 6/2001 | Silverbrook et al. |
| 6,247,791 B1 | 6/2001 | Silverbrook |
| 6,247,792 B1 | 6/2001 | Silverbrook |
| 6,247,793 B1 | 6/2001 | Silverbrook |
| 6,247,794 B1 | 6/2001 | Silverbrook |
| 6,247,795 B1 | 6/2001 | Silverbrook |

(Continued)

OTHER PUBLICATIONS

Hideo, Newspaper Preparing Method, Feb. 12, 2003, Machine Translation Japanese Patent Application Publication, JP2003-341927, All Pages.*

*Primary Examiner* — Ngon Nguyen

(74) *Attorney, Agent, or Firm* — Cantor Colburn LLP

(57) ABSTRACT

A system and method are provided for providing a variable data publication, wherein such publication is built as a custom publication for a particular user or group of users that includes editorial content or advertising that is based upon the intent of such user or group of users.

30 Claims, 4 Drawing Sheets

(56) References Cited

U.S. PATENT DOCUMENTS

| | | |
|---|---|---|
| 6,247,796 B1 | 6/2001 | Silverbrook |
| 6,254,220 B1 | 7/2001 | Silverbrook |
| 6,257,704 B1 | 7/2001 | Silverbrook |
| 6,257,705 B1 | 7/2001 | Silverbrook |
| 6,260,953 B1 | 7/2001 | Silverbrook et al. |
| 6,264,306 B1 | 7/2001 | Silverbrook |
| 6,264,307 B1 | 7/2001 | Silverbrook |
| 6,267,469 B1 | 7/2001 | Silverbrook |
| 6,273,544 B1 | 8/2001 | Silverbrook |
| 6,283,581 B1 | 9/2001 | Silverbrook |
| 6,283,582 B1 | 9/2001 | Silverbrook |
| 6,293,653 B1 | 9/2001 | Silverbrook |
| 6,302,528 B1 | 10/2001 | Silverbrook |
| 6,309,048 B1 | 10/2001 | Silverbrook |
| 6,312,107 B1 | 11/2001 | Silverbrook |
| 6,336,710 B1 | 1/2002 | Silverbrook |
| 6,338,547 B1 | 1/2002 | Silverbrook |
| 6,362,843 B1 | 3/2002 | Silverbrook |
| 6,362,868 B1 | 3/2002 | Silverbrook |
| 6,364,461 B2 | 4/2002 | Silverbrook |
| 6,378,989 B1 | 4/2002 | Silverbrook |
| 6,378,990 B2 | 4/2002 | Silverbrook |
| 6,390,603 B1 | 5/2002 | Silverbrook |
| 6,394,581 B1 | 5/2002 | Silverbrook |
| 6,406,129 B1 | 6/2002 | Silverbrook |
| 6,416,154 B1 | 7/2002 | Silverbrook |
| 6,416,167 B1 | 7/2002 | Silverbrook |
| 6,416,168 B1 | 7/2002 | Silverbrook |
| 6,420,196 B1 | 7/2002 | Silverbrook |
| 6,425,657 B2 | 7/2002 | Silverbrook |
| 6,425,658 B2 | 7/2002 | Silverbrook |
| 6,428,133 B1 | 8/2002 | Silverbrook |
| 6,435,664 B2 | 8/2002 | Silverbrook |
| 6,439,689 B1 | 8/2002 | Silverbrook |
| 6,439,694 B1 | 8/2002 | Silverbrook |
| 6,439,695 B2 | 8/2002 | Silverbrook |
| 6,443,558 B1 | 9/2002 | Silverbrook |
| 6,443,559 B1 | 9/2002 | Silverbrook |
| 6,447,100 B2 | 9/2002 | Silverbrook |
| 6,454,396 B2 | 9/2002 | Silverbrook |
| 6,457,809 B1 | 10/2002 | Silverbrook |
| 6,457,812 B1 | 10/2002 | Silverbrook |
| 6,457,813 B2 | 10/2002 | Silverbrook |
| 6,464,325 B2 | 10/2002 | Silverbrook |
| 6,471,336 B2 | 10/2002 | Silverbrook |
| 6,485,123 B2 | 11/2002 | Silverbrook |
| 6,488,358 B2 | 12/2002 | Silverbrook et al. |
| 6,488,359 B2 | 12/2002 | Silverbrook |
| 6,488,360 B2 | 12/2002 | Silverbrook |
| 6,488,361 B2 | 12/2002 | Silverbrook |
| 6,505,912 B2 | 1/2003 | Silverbrook et al. |
| 6,505,916 B1 | 1/2003 | Silverbrook |
| 6,508,546 B2 | 1/2003 | Silverbrook |
| 6,540,331 B2 | 4/2003 | Silverbrook |
| 6,547,364 B2 | 4/2003 | Silverbrook |
| 6,547,368 B2 | 4/2003 | Silverbrook |
| 6,550,895 B1 | 4/2003 | Silverbrook |
| 6,550,896 B2 | 4/2003 | Silverbrook |
| 6,557,977 B1 | 5/2003 | Silverbrook |
| 6,565,181 B2 | 5/2003 | Silverbrook |
| 6,616,271 B2 | 9/2003 | Silverbrook |
| 6,618,117 B2 | 9/2003 | Silverbrook |
| 6,623,101 B1 | 9/2003 | Silverbrook et al. |
| 6,623,108 B2 | 9/2003 | Silverbrook |
| 6,625,874 B2 | 9/2003 | Silverbrook |
| 6,634,735 B1 | 10/2003 | Silverbrook |
| 6,644,771 B1 | 11/2003 | Silverbrook |
| 6,702,417 B2 | 3/2004 | Silverbrook |
| 6,712,986 B2 | 3/2004 | Silverbrook et al. |
| 6,803,989 B2 | 10/2004 | Silverbrook |
| 6,814,429 B2 | 11/2004 | Silverbrook |
| 6,848,181 B1 | 2/2005 | Silverbrook |
| 6,857,719 B2 | 2/2005 | Silverbrook |
| 6,918,654 B2 | 7/2005 | Silverbrook |
| 6,945,923 B2 | 9/2005 | Graber et al. |
| 6,981,214 B1 * | 12/2005 | Miller ............... G06F 17/30867 705/14.61 |
| 6,981,757 B2 | 1/2006 | Silverbrook et al. |
| 7,021,746 B2 | 4/2006 | Silverbrook et al. |
| 7,044,589 B2 | 5/2006 | Silverbrook |
| 7,252,367 B2 | 8/2007 | Silverbrook |
| 7,381,340 B2 | 6/2008 | Silverbrook |
| 2006/0238817 A1 | 10/2006 | Tasaka et al. |
| 2008/0301678 A1 * | 12/2008 | Bottcher ............... G06Q 10/00 718/100 |
| 2010/0201774 A1 * | 8/2010 | Motojima ............... B41J 3/44 347/104 |
| 2011/0010370 A1 * | 1/2011 | Cosgrove ............ G06F 17/2229 707/748 |

* cited by examiner

SYSTEMS AND METHODS FOR VARIABLE DATA PUBLICATION

TECHNICAL FIELD

The present invention is generally related to data publications. More particularly, example embodiments of the present invention are directed to systems and methods for providing variable data publications, such as newspapers, periodicals, tabloids, books, etc.

BACKGROUND OF THE INVENTION

The below description will discuss newspapers as a primary example of publications. However, it should be understood that the present disclosure is not limited to newspapers, but instead extends to other publications, printed or digital, including but not limited to books, periodicals, tabloids, etc.

Newspaper companies (and other providers of printed publications) typically circulate a large number of identical newspapers for a given time period, e.g., morning, evening/late, daily, bi-weekly, weekly, bi-monthly, monthly, etc., or provide a certain number of identical editions. Such production methods are known as static methods where all of the first, second and additional pages printed are identical to all other first, second and additional pages. Static printing methods are discussed in U.S. Pat. No. 6,945,923, issued on Sep. 20, 2005, and entitled "Method for Producing a Newspaper," which is herein incorporated by reference in its entirety.

Once a newspaper's content has been determined, for example after receiving final content from a newspaper's head office, printing plates are generated using offset printing devices, e.g., computer-to-plate or computer-to-film devices, which allow for a large number of identical newspapers to be generated. Newspaper printing techniques that employ printing plates are described in U.S. Patent Application Publication No. 2006/0238817, published on Oct. 6, 2006, and entitled "Method and System for Printing Management," which is herein incorporated by reference in its entirety. Once the plates are fabricated and the newspaper pages printed, the newspaper pages are subsequently assembled, e.g., folded at a folding station, to form a section or a complete newspaper and are dispatched for delivery to subscribers.

Due to traditional newspapers being printed in high quantities, printing methods that use printing plates are economically acceptable. However, newspaper subscribers may prefer to receive specific information that may not be provided in a traditional newspaper, or that may be buried within a traditional newspaper and thus are difficult to find. Providing news content to subscribers according to each of their preferences is not possible (or not economically feasible) when using printing plate technologies due to the difference in content or formatting and the static nature of printing plates.

While digital printing methods have been used to print variable content in general, there is room for improvement with regard to how content is provided.

SUMMARY

The above-described an other problems and disadvantages of the prior art are overcome or alleviated by the present systems and methods for providing a variable data publication. In exemplary embodiments, such publication is built as a custom publication for a particular user or group of users that includes data, e.g., editorial content and/or advertising, that is based upon the intent of such user or group of users. In exemplary embodiments, such intent is declared intent. In other exemplary embodiments, such intent is implied intent. In other exemplary embodiments, implied intent (e.g., demographics or other driver) may be initially used to deliver customized content, followed by use of declared intent for customized content or refinement of customized content.

Further, the variable data publication may be, in exemplary embodiments, provided in print format, e.g., digital print. In other exemplary embodiments, such publication may be provided in digital format for one or more digital devices, e.g., computers, tablets, smart phones, etc.

Additionally, the type of customized data that may be provided may be editorial content, advertising content or a combination of the two. Editorial content includes, without limitation, news features, fiction, opinion, data, statistics, graphics, images and other "created" content.

In additional exemplary embodiments, the publication is a newspaper that is constructed with editorial content and/or advertising based upon declared or implied intent of a user or group of users. In exemplary embodiments, such intent is based upon additional editorial content that is selected by users or groups of users, e.g. without limitation, via a web site, web portal, social media network, mobile application, subscription group or other electronic or online avenue.

In one exemplary embodiment, content is first provided to a user or group of users, followed by receipt of such intent, after which varied editorial content and/or advertising is provided to the user or group of users based upon that intent.

In exemplary embodiments, content is either directly selected by a user or group of users or selected based upon other intent aspects, e.g., according to selected categories, with automatic arrangement of content into the publication. Such content may comprise all or only a portion of the content of the publication. In exemplary embodiments, such user specified content comprises 1-100 percent, 10-90 percent, 25-75 percent, or some other range selected either by the user or groups of users or by the publishing system providing the publication based on declared intent.

In other exemplary embodiments, advertising relative to the declared intent of a user or group of users are sold and targeted for such publication for inclusion therein.

In exemplary embodiments, such publication(s) may be provided upon request, or may be part of a subscription or periodical, with either pre-set or ongoing intents from the user or group of users.

In exemplary embodiments, a paper is printed via a print matrix with a printing system having the capacity to change content to be printed in real-time. In an exemplary configuration, a newspaper printing system includes one or more data storage devices for storing at least consumer data and one or more of news and advertising data, a page handling processor for receiving data from the one or more data storage devices and formatting one or more newspaper pages for a newspaper to be printed based on at least the consumer data and one or more of news and advertising data received, and a digital printer comprising at least one print matrix.

An exemplary method for running a digital printing cycle in printing newspapers includes providing a continuous paper web to a high-speed digital printer, the digital printer comprising at least one print matrix that delivers ink to the paper web as it moves past the printhead, printing onto the continuous paper web rows of images that differ from row to row, the row to row printed images comprising a first segment, the first segment formatted corresponding to preferences of a first user, printing onto the continuous web a second segment of web rows that differ from row to row, and which differ from the first segment, the second segment formatted corresponding to preferences of a second user, slicing the continuous web at least between the first and second segment; assembling each sliced segment into a newspaper, and dispatching each newspaper to the corresponding user.

As we noted above, the present disclosure is not limited to printed newspapers, but to custom publications in general, delivered by print or digital mediums, and specifically with regard to implied and/or declared intent of a user or group of users.

These and other features and advantages of aspects of the present invention will become apparent to those skilled in the art from the following detailed description, where it is shown and described illustrative embodiments, including best modes contemplated for carrying out the invention. As it will be realized, the various aspects of the invention are capable of modifications in various obvious respects, all without departing from the spirit and scope of the present invention. Accordingly, the drawings and detailed description are to be regarded as illustrative in nature and not restrictive.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. Furthermore, each drawing contained in this provisional application includes at least a brief description thereon and associated text labels further describing associated details. The figures.

DETAILED DESCRIPTION

Figure 1:
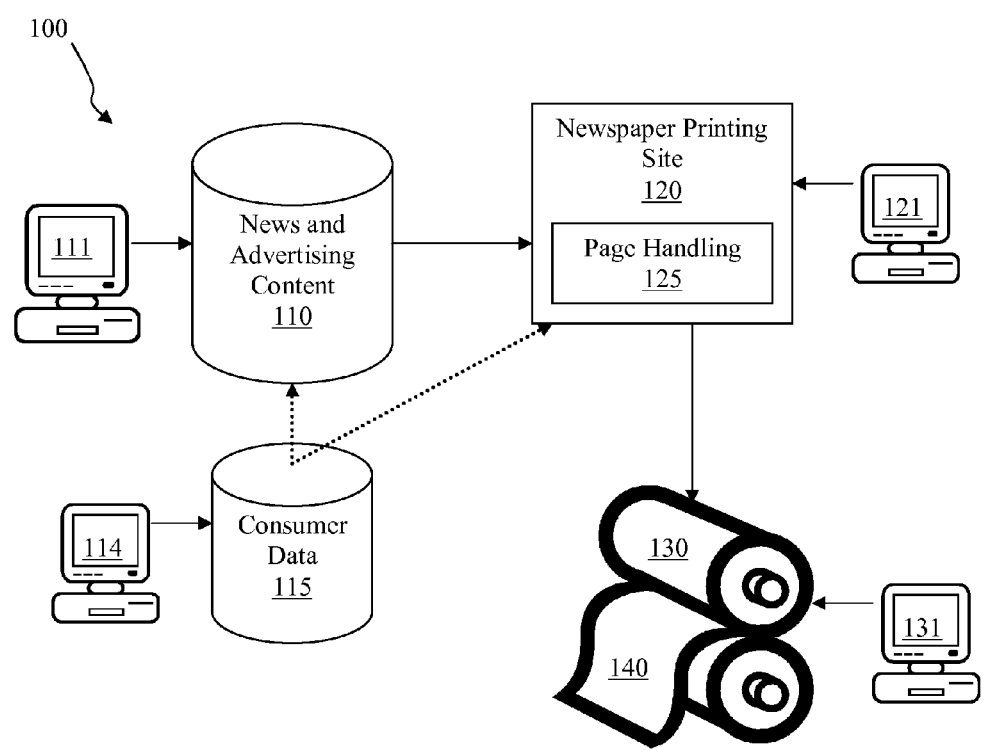
FIG. 1 depicts a block diagram of an exemplary newspaper printing system.

Further to the brief description provided above and associated textual detail of each of the figures, the following description provides additional details of example embodiments of the present invention.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail.

Example embodiments of the present invention provide systems and methods for providing a variable data publication. In exemplary embodiments, such publication is built as a custom publication for a particular user or group of users that includes data, e.g., editorial content and/or advertising content, that is based upon the intent of such user or group of users. In exemplary embodiments, such intent is declared intent. In other exemplary embodiments, such intent is implied intent. In other exemplary embodiments, implied intent (e.g., demographics or other driver) may be initially used to deliver customized content, followed by use of declared intent for customized content or refinement of customized content.

Further, the variable data publication may be, in exemplary embodiments, provided in print format, e.g., digital print. In other exemplary embodiments, such publication may be provided in digital format for one or more digital devices, e.g., computers, tablets, smart phones, etc.

Additionally, the type of customized data that may be provided may be editorial content, advertising content or a combination of the two. Editorial content includes, without limitation, news features, fiction, opinion, data, statistics, graphics, images and other "created" content.

In additional exemplary embodiments, the publication is a newspaper that is constructed with editorial content and/or advertising based upon declared or implied intent of a user or group of users. In exemplary embodiments, such intent is based upon additional editorial content that is selected by users or groups of users, e.g. without limitation, via a web site, web portal, social media network, mobile application, subscription group or other electronic or online avenue.

In one exemplary embodiment, content is first provided to a user or group of users, followed by receipt of such intent, after which varied editorial content and/or advertising is provided to the user or group of users based upon that intent.

In exemplary embodiments, content is either directly selected by a user or group of users or selected based upon other declared intent aspects, e.g., according to selected categories, with automatic arrangement of content into the publication. Such content may comprise all or only a portion of the content of the publication. For example, a base editorial package can be supplemented with user-specified content. In exemplary embodiments, such user specified content comprises 1-100 percent, 10-90 percent, 25-75 percent, or some other range selected either by the user or groups of users or by the publishing system providing the publication based on declared intent.

Further, in exemplary embodiments, advertising content and/or editorial content need not be gathered from any single source. Rather, third party content may be pulled from outside sources related to user intent. In exemplary scenarios, relationships may be established between third party content owners and the publishing system/platform, wherein content is supplied for use in the present system and method. In exemplary embodiments, repositories of data may be established relevant to one or more areas of interest, e.g. science. Such repositories may include data from plural third party sources. Further, compensation systems may be employed to automatically compensate content owners for use of content within those repositories (or otherwise obtained). Such systems may also tie into advertising systems, platforms and methods, wherein advertising content related to editorial content is similarly provided for publication. Such exemplary systems also allow for tracking of delivered content, with relevant analytics, charts, etc. relevant to editorial content and/or advertising content.

In other exemplary embodiments, advertising relative to the intent of a user or group of users are sold and targeted for such publication for inclusion therein. Such intent may be declared or implied. Further, in exemplary embodiments, implied intent (e.g., demographics or other drivers) may be utilized to provide custom content to a user, followed by use of declared intent to further provide or refine such custom content.

In exemplary embodiments, such publication(s) may be provided upon request, or may be part of a subscription or periodical, with either pre-set or ongoing declared intents from the user or group of users.

The below description will discuss newspapers as a primary example of printed publications. However, it should be understood that the present disclosure is not limited to newspapers, but instead extends to other publications, printed and digital (e.g., a digital media product), including but not limited to books, periodicals, tabloids, etc.

Further, the term "declared intent" should be interpreted to include positive user (or user group) action to specify content in some way, e.g. without limitation, selection of content itself, selection of categories, subscription to content, subjects or categories, etc., as contrasted with implied intent as derived from demographics, such as gender, income, neighborhood, etc. (which may, among other factors, affect "implied intent."

Additionally, it should be noted that the terms "consumer", "subscriber", and "user" all refer to the individual or groups of individuals for which the publication is customized according the their declared intent.

As we noted above, exemplary embodiments provide a newspaper printing system and method that uses high-speed digital printing technologies to enable the content, format, fonts, and colors of each printed page to change from page-to-page and from paper-to-paper. The various aspects of such exemplary embodiments are described below with reference to the Figures.

However, it will be understood by those of skill in the art that the newspaper (or other publication) printing system may have various configurations in addition to those described below, including any type of printed publication system. Further, the system and method described herein need not be characterized as a "printing system," but instead may more generally be described as a "publication system" in order to accommodate other variable data publication formats, such as digital media.

FIG. 1 provides a schematic diagram of an exemplary newspaper printing system, shown generally at 100. System 100 includes news and advertising content database 110 (though these may be distinct) with CPU 111, consumer database 115 with CPU 114, newspaper printing site 120 with CPU 121 and page handing processor 125, printer 130 with CPU 131, and paper web 140.

News and advertising content database 110 receives newspaper content from CPU 111 or from another network source, which may be updated periodically or in real-time. News content provided to database 110 may be any type, including world, local, financial, sports, opinion and editorial articles. Advertising content may include various ads, in general or which are tailored for specific demographics or products and/or may include offer codes or pass codes used to track consumers. Data from news and advertising content database 110 is provided to newspaper printing site 120 periodically or in real-time. It should be recognized that the received data may be received and arranged via a system that is also intermediate the printing site 120 and the databases 110 and 115, and that the term "printing system" should be interpreted to be inclusive of said intermediate system.

Consumer database 115 may receive consumer data from CPU 114, and may also be updated periodically or in real time. Consumer data may include consumer/customer/subscriber profiles and preferences related to presentation of newspaper content for a specific consumer, e.g., consumer A, B, . . . n, or specific groups of consumers. For example, a consumer or customer service representative may enter a consumer's preferences via a web-page associated with the newspaper production company where the data is received and sent to consumer database 115.

Regardless of the particular mechanism used to enter user (consumer) intent, the exemplary newspaper is constructed with editorial content based upon that declared intent (though demographics or other user or group characteristics may be used in addition to declared intent). In exemplary embodiments, such declared intent is based upon additional editorial content that is selected by users or groups of users, e.g. without limitation, via a web site, web portal, social media network, mobile application, subscription group or other electronic or online avenue.

In exemplary embodiments, content is either directly selected by a user or group of users or selected based upon other declared intent aspects, e.g., according to selected categories, with automatic arrangement of content into the publication. Such content may comprise all or only a portion of the content of the publication. For example, a base editorial package can be supplemented with user-specified content. In exemplary embodiments, such user specified content comprises 1-100 percent, 10-90 percent, 25-75 percent, or some other range selected either by the user or groups of users or by the publishing system providing the publication based on declared intent.

In other exemplary embodiments, advertising relative to the declared intent of a user or group of users are sold and targeted for such publication for inclusion therein.

In exemplary embodiments, such printed publication(s) may be provided upon request, or may be part of a subscription or periodical, with either pre-set or ongoing declared intents from the user or group of users.

In addition, the publishing company or data from the consumer profile may provide relevant consumer information, such as type of edition to be provided to a consumer, e.g., retiree edition, young professionals, students, financial services, or additional demographic information, each of which may result in adjustment of the newspaper content to provide a different emphasis.

Although consumer database 115 is depicted as a single database, consumer preference data may be stored on multiple databases. Data from consumer database 115 may be provided to one or both of news and advertising content database 110 and newspaper printing site 120.

Printing site 120 receives data from various data sources including news and advertising database 110, consumer database 115, and CPU 121. In FIG. 1, using CPU 121, a user may control various functions at newspaper printing site 120. Although a single newspaper printing site 120 is depicted in system 100, it will be understood that multiple printing sites may be provided.

At printing site 120, page handling processor 125 formats the pages of the newspaper to be printed based on data and instructions received. For example, page handling processor 125 may receive content and preference data for formatting the newspaper page from news and advertising content database 110 and consumer database 115. Page handling processor 125 may also receive instructions from newspaper printing site 120, CPU 111, 114, 121 and/or 131, directly or via a network. In particular, page handling processor 125 processes the consumer-specific data (from declared intent data) from consumer database 115 and the content from news and advertising content database 110 and formats the content and organization of a specific consumer's newspaper. In one example, news content is selected based on the consumer's subscription, and tailored advertising content is selected by page handling processor 125 according to the consumer's declared intent data and/or demographic data received.

Figure 2:
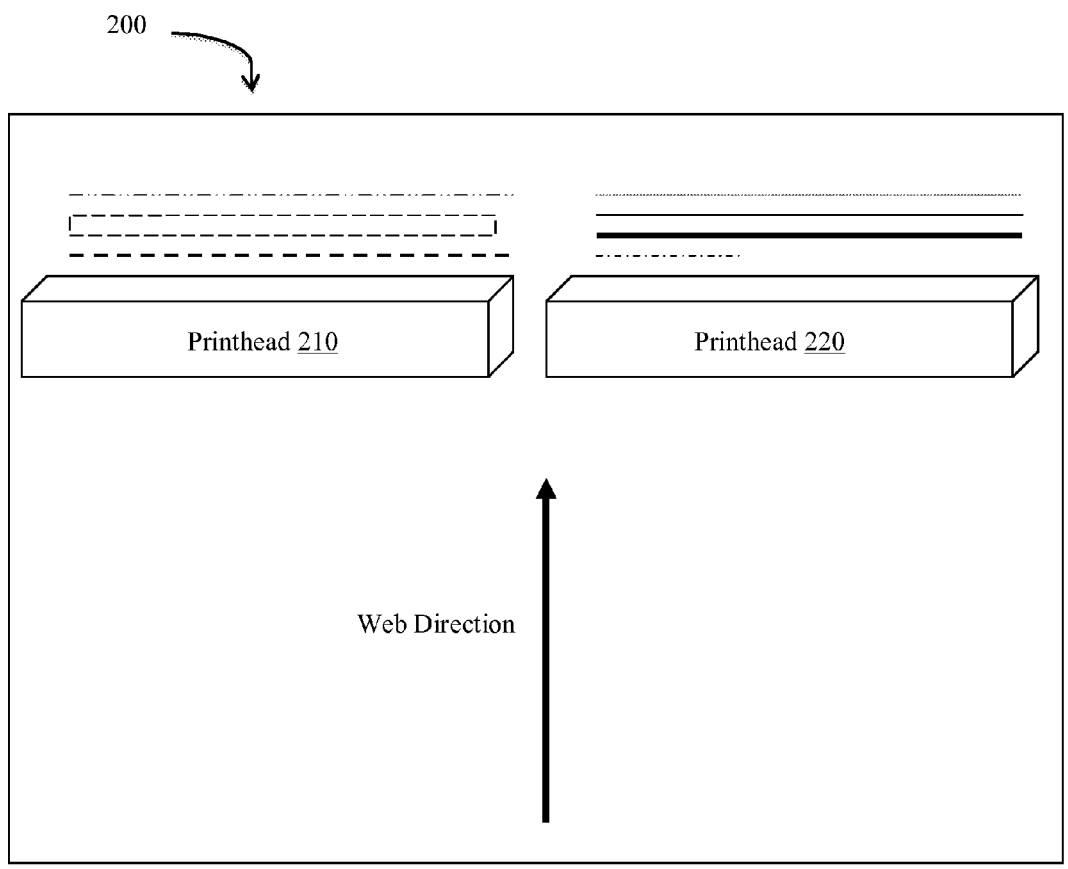
FIG. 2 is a block illustration of an exemplary multi-printhead arrangement.

Formatted content is provided to printer 130, controllable via CPU 131, and the content is printed on paper web 140. In certain configurations, printer 130 includes digital printheads that span the width of each newspaper page to be printed. For example, for paper web 140, at least one printhead spans the width of the portion of the paper web corresponding to a newspaper page print width. This arrangement allows one or more printheads to remain stationary while paper web 140 is moved past the area of the printhead. For example, FIG. 2 depicts a paper web spanning two newspaper pages; and each page runs past a digital printhead arrangement including printhead 200 and 201, each spanning the width of a newspaper page to be printed. Thus, printer 130 may be configured as a high-speed printer because digital printheads no longer move across the paper during the printing process.

Some exemplary printheads that span the width of a page to be printed are produced by Hewlett-Packard and Silverbrook Research Pty. Ltd., both of which employ digital printing using inkjet technology to achieve high-speed printing. The Hewlett-Packard (HP) Edgeline printhead technology uses page-wide printheads that provide fast-drying ink to paper via ink jets, along with high-speed rotating drums to carry paper under the printhead allowing multiple passes at high speeds, e.g., for color printing. These printheads are provided in the HP CM8060 and CM8050 Color multifunction printers. Silverbrook Research Pty. Ltd. Memjet printheads have one or more printhead chips that together incorporate tens of thousands, e.g., 84,000, nozzle arrangements. For example, multiple printheads having a width of 20 mm with approximately 6400 print nozzles (1600 dpi resolution, one picoliter droplet size) may be employed across the width of a page to be printed so that the printhead does not need to move across the page, and instead only the paper being printed on moves along the printhead. These printheads are described in U.S. Pat. No. 7,252,367, issued on Aug. 7, 2007, which is herein incorporated by reference in its entirety. Memjet printheads are further described in the following U.S. patents, which are herein incorporated by reference in their entireties: U.S. Pat. Nos. 6,227,652; 6,213,588; 6,213,589; 6,231,163; 6,247,795; 6,394,581; 6,244,691; 6,257,704; 6,416,168; 6,220,694; 6,257,705; 6,247,794; 6,234,610; 6,247,793; 6,264,306; 6,241,342; 6,247,792; 6,264,307; 6,254,220; 6,234,611; 6,302,528; 6,283,582; 6,239,821; 6,338,547; 6,247,796; 6,557,977; 6,390,603; 6,362,843; 6,293,653; 6,312,107; 6,227,653; 6,234,609; 6,238,040; 6,188,415; 6,227,654; 6,209,989; 6,247,791; 6,336,710; 6,217,153; 6,416,167; 6,243,113; 6,283,581; 6,247,790; 6,260,953; 6,267,469; 6,273,544; 6,309,048; 6,420,196; 6,443,558; 6,439,689; 6,378,989; 6,848,181; 6,634,735; 6,623,101; 6,406,129; 6,505,916; 6,457,809; 6,550,895; 6,457,812; 6,428,133; 6,362,868; 6,485,123; 6,425,657; 6,488,358; 7,021,746; 6,712,986; 6,981,757; 6,505,912; 6,439,694; 6,364,461; 6,378,990; 6,425,658; 6,488,361; 6,814,429; 6,471,336; 6,457,813; 6,540,331; 6,454,396; 6,464,325; 6,443,559; 6,435,664; 6,447,100; 7,381,340; 6,439,695; 6,488,360; 6,488,359; 6,550,896; 6,618,117; 6,803,989; 7,044,589; 6,416,154; 6,547,364; 6,644,771; 6,565,181; 6,857,719; 6,702,417; 6,918,654; 6,616,271; 6,623,108; 6,625,874; 6,547,368; 6,508,546.

Other, more modern, suitable printheads include Thermal DOD (e.g., from HP), Piezo DOD (e.g., from Kyocera, Panasonic, etc.) and continuous inkjet of various types, including without limitation STREAM (from Kodak).

Figure 3:
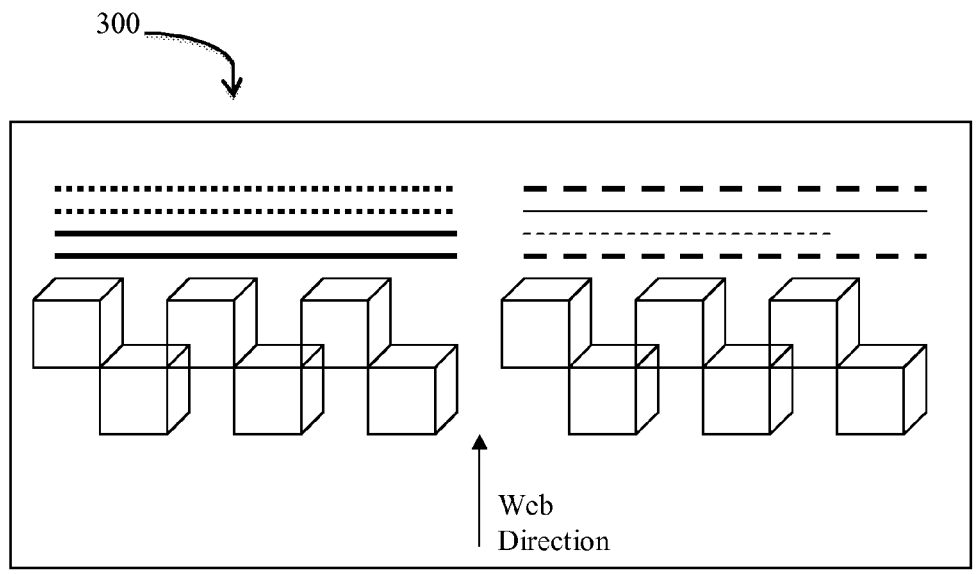
FIG. 3 is a block illustration of an exemplary multi-printhead arrangement with a staggered orientation.
Figure 4:
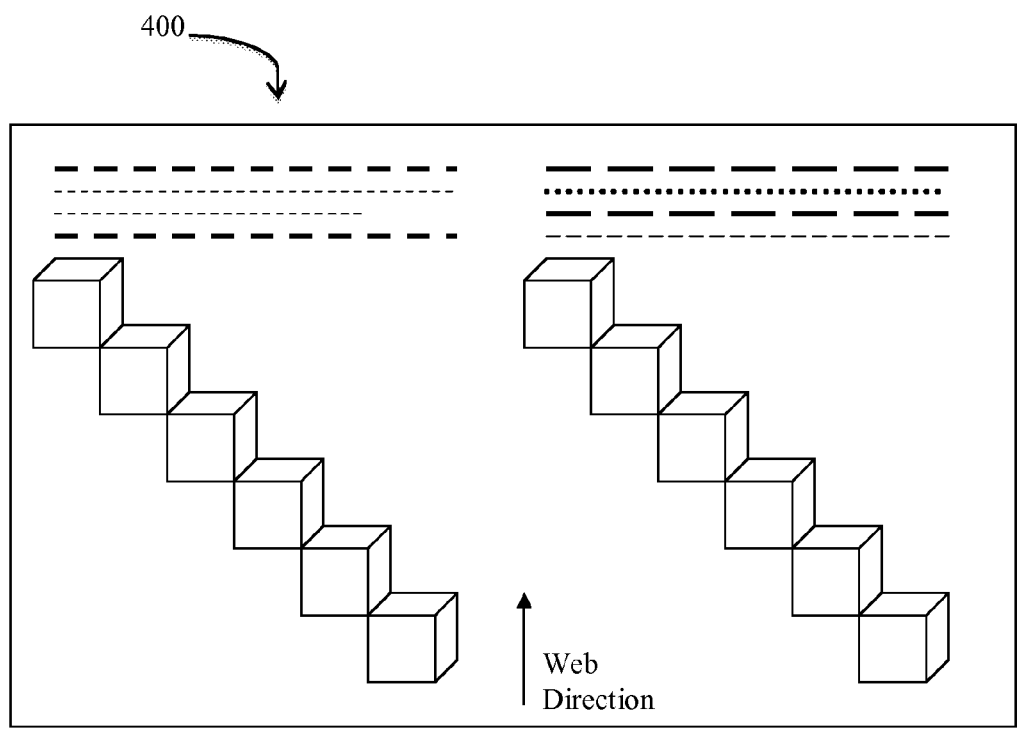
FIG. 4 is a block illustration of an exemplary multi-printhead arrangement with a diagonal orientation.

It will be understood that in system 100, extensible printheads, like the Memjet printheads, capable of cooperating with other printheads may be used to configure page-wide printhead arrangements. When multiple printheads are used, the printhead arrangement may have various configurations, including a side-by-side arrangement (shown generally at 200) resembling the printheads of FIG. 2, a staggered arrangement (shown generally at 300) as in FIG. 3, or a diagonal arrangement (shown generally at 400) as in FIG. 4. Moreover, block printhead arrangements may be provided, for example, a n×n square, e.g., 6×6, or a n×m, e.g., 6×2 rectangle of printheads may be provided so that a larger area, e.g., 2-6 times larger, may be printed on compared to the arrangements of FIGS. 2-4. Thus, the plurality of printheads together may provide from 50,000 to 1,000,000 nozzle arrangements and may print at a resolution of between 1200 and 1600 dpi.

CPU 131 associated with printer 130 may facilitate control of the operations of printer 130, for example, so that the speed of the web is coordinated with the rate of ink deposition. When ink dryers are required, CPU 131 may coordinate the web speed through the dryer and/or the drying intensity of the ink dryer.

The printed newspapers are subsequently cut, organized, folded and dispatched to the specific customer having data stored on the consumer database. Each time a paper is printed, page handling processor 125, or the like, processes another set of consumer data from consumer database 115 in order to send another set of consumer-specific data to printer 130.

Although system 100 is depicted with CPUs coupled to the various system components, e.g., databases, printing site and printer, it will be understood that CPUs may be communicatively coupled with the one or more system components via the Internet, intranet, or other communications network. In addition, CPUs may contain the appropriate hardware and software required to accomplish their intended functions. Moreover, consumer and advertising database 110 and consumer database 115 need not be separate and may be combined into one database. Alternatively, content and consumer data may be separated into multiple databases and may store a single type of data, e.g., news data, or any number of data types relevant to newspaper printing processes. Further, web-fed printer 130 being configured to print on a continuous paper web may have various configurations.

U.S. Pat. No. 6,821,038, issued on Nov. 23, 2004, and entitled "Newspaper Producing Method," and U.S. Publication No. 2006/0187472, published on Aug. 24, 2006, and entitled "Web-Fed Printing Press," are herein incorporated by reference in their entireties.

System 100 may have alternate production configurations in addition to the configuration depicted in FIG. 1. For example, an ink dryer (not shown) may be arranged in system 100 to facilitate the ink drying process after the paper web has been printed. An ink dryer may introduce heat, air, infrared, UV light or any other energy source, for example, to facilitate the drying process. In addition, the paper web may be sliced before and/or after printing, and one or more paper slicers (not shown) may be included in the production arrangement. Further, a paper assembly and/or folding device (not shown) may be provided in the production configuration to allow the consumer-specific printed newspaper pages to be assembled and folded. Other devices including bagging, labeling, and/or stacking devices (not shown) may also be included in a production configuration.

In exemplary use, news and advertising content are arranged in frames and are assigned a distinct tag for identifying the content element, e.g. type of content and priority. The identifiers are used to assemble the pages that will make up the newspaper. The tags may be arranged according to a desired combination of elements specific to a consumer. Page creation software and/or hardware, for example, provided in page handling processor 125, may interface with the news and advertising content and with the consumer preferences and profiles to produce a consumer-specific page. In addition, image processing hardware and/or software, which converts a formatted page into the specific commands necessary to drive the inking, paper and printhead technology in a coordinated manner to produce the desired image, which may be implemented in, for example, page handling processor 125, printer 130 and/or CPU 131. Further, technology for controlling ink heads, for example, in printer 130 and/or CPU 131, takes the output from the image processing and converts the information to electrical signals necessary to drive the mechanical printheads. Ink to paper technology uses electromechanical technologies and printhead equipment to ensure optimal laydown of ink to the substrate, e.g., paper web 140, which may be implemented by printheads including printheads 201, 202. These technologies may together coordinate the generation of consumer-specific newspapers as provided in the exemplary method of FIG. 5.

Figure 5:
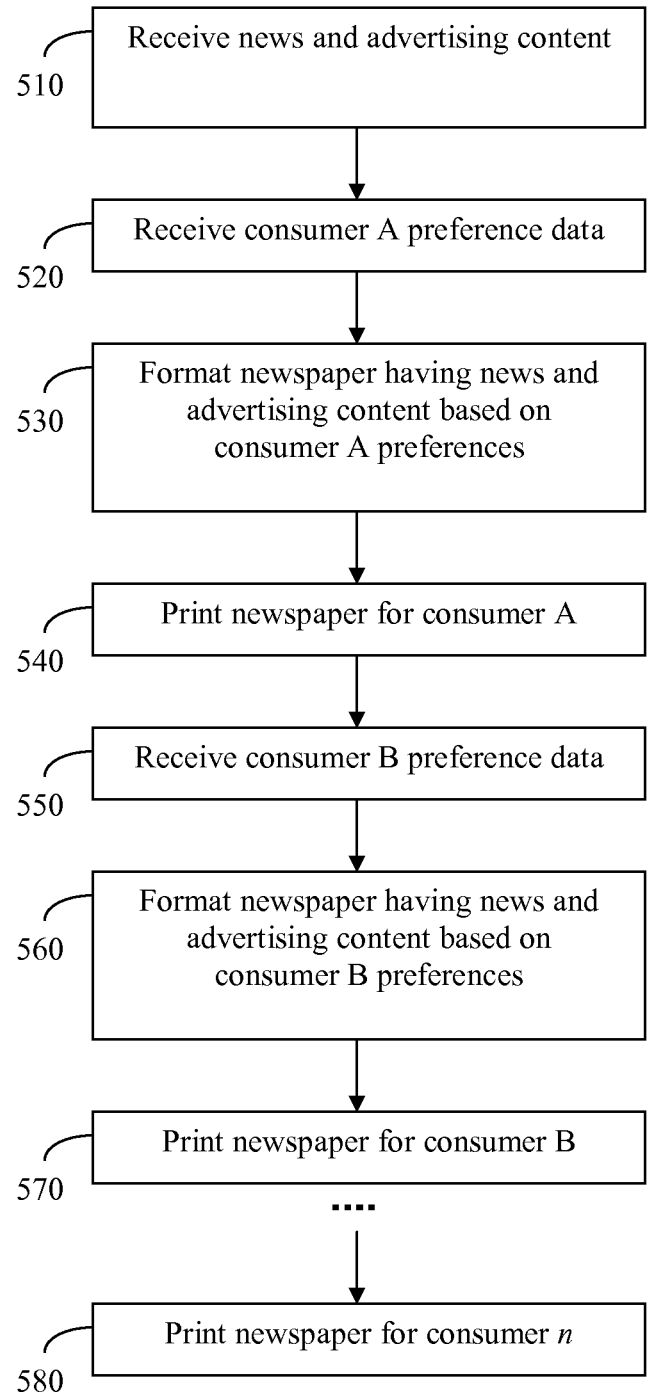
FIG. 5 depicts a flowchart of an exemplary method for printing newspapers according to the preferences of each consumer.

In FIG. 5, a flowchart of an exemplary method for generating consumer-specific newspapers is provided. According to FIG. 5, news and advertising content is received 510, for example from an editor's CPU over a network, and consumer A preference data (data relating to a consumer/user/group's declared intent) is received 520, for example from a consumer's personal profile information stored on a consumer database. The newspaper is formatted 530 so that the news and advertising content are arranged according to the preferences of consumer A. Once formatted 530, the newspaper for consumer A is printed 540. The consumer-specific newspaper generating process next includes the receipt 550 of the preferences of consumer B (data relating to another consumer/user/group's declared intent), for example from the same consumer database that stores consumer A data. The news and advertising content for the newspaper are formatted 560 according to the preferences of consumer B, and the newspaper for consumer B is printed 570. The consumer-specific newspaper printing process continues until the newspaper for consumer n is printed 580.

Although news and advertising content in FIG. 5 is received 510 at the beginning of the newspaper generating process, it will be understood that the newspaper content may be received throughout the printing cycle so that updated and/or current information may be provided to a consumer's newspaper. As a result, those newspapers in queue to print may be printed with updated content as it is received by the printing system. In addition, consumer preferences related to the form and content of the newspaper may be updated and the consumer-specific newspaper may be printed according to the updated user preferences. Thus, although customized newspapers may be printed in a printing cycle on a periodic basis, at the time of printing, the most current news and advertising content may be provided in the desired format. Such an arrangement removes the need for implementing early and late edition printing models for daily newspapers, for example.

Providing digital printing capabilities to newspaper production arrangements enables variable content to be sequentially provided on the paper web, and production of customized newspapers for a given consumer is made possible. By implementing the systems and methods of the invention, items electronically rendered on a page may be rendered in a printed format. This is in contrast to film/plate printing technology, which requires that images be converted to a static plate and mounted to a printing press for producing multiple identical copies.

In addition, because variable printing arrangements are available to newspaper publishers, large-scale newspaper operations may be broken into branch offices or satellite stations located more centrally to a given set of consumers. This allows content to vary according to the printing location and local news and advertising content may be provided on a consumer-specific printed newspaper. In addition, with respect to advertising content, classified and local merchant ads may be executed in the form of regional or hyper-local. Localizing the printing location also reduces energy costs related with delivering the newspaper. In addition, paper distribution models may also be changed as a result of the new newspaper production arrangement.

Another advantage provided by the presently described system and method is that multiple different products may be printed from a single printing press. Thus, various news and advertising content databases may be communicatively coupled to a newspaper production arrangement, and the arrangement may allow additional products to be distributed to consumers that otherwise would not have access.

Systems and methods described herein provide cost-savings due to certain exemplary printers described herein having a small physical size, short start up time between paper productions runs, and removed printing plate technology which otherwise incurs costs due to plate creation and set-up.

Additionally, exemplary systems and methods described herein advantageously provide users/consumers/subscribers/etc. with the type of content they want in an easy to read, disposable medium.

More importantly, exemplary systems and methods provide, whether in printed format or as a digital media product, customized editorial content and/or advertising content according to implied and/or disclosed user intent, advantageously providing system flexibility and scalability that has been previously lacking in the prior art.

The methodologies and systems of example embodiments of the present invention can be implemented in hardware, software, firmware, or a combination thereof. Embodiments may be implemented in software or firmware that is stored in a memory and that is executed by a suitable instruction execution system. These systems may include any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of at least one example embodiment of the present invention in which functions may be executed out of order from that shown or discussed, including substantially concurrently or in reverse order, depending on the functionality involved, as would be understood by those reasonably skilled in the art of the present invention.

Any program which would implement functions or acts noted in the figures, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware or software-configured mediums.

It should be emphasized that the above-described embodiments of the present invention, particularly, any detailed discussion of particular examples, are merely possible examples of implementations, and are set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method for providing a variable data publication, comprising:
    at a publication system operating via one or more CPUs, receiving electronic data relative to a first consumer or first group of consumers, the data relating to at least one intent of said first consumer or first group of consumers;
    receiving at said publication system editorial content or advertising content relating to said at least one intent of said first consumer or first group of consumers;
    producing, at a publication system operating via said one or more CPUs, a first publication for said first consumer or first group of consumers including at least some of said editorial content or advertising content relating to said intent of said first consumer or first group of consumers, wherein said intent of said first consumer or first group of consumers is implied intend for said first publication for said first consumer or first group of consumers and is a combination of initial implied intent and declared intent for a second, subsequent publication relative to said first publication for said first consumer or first group of consumers;
    at said publication system, receiving data relative to a second consumer or second group of consumers, the data relating to at least one intent of said second consumer or second group of consumers;
    receiving at said publication system editorial content or advertising content relating to said at least one intent of said second consumer or second group of consumers; and
    producing, at said publication system, a third publication for said second consumer or second group of consumers including at least some of said editorial content or advertising content relating to said intent of said second consumer or second group of consumers, wherein said intent of said second consumer or second group of consumers is implied intend for said third publication for said second consumer or second group of consumers and is a combination of initial implied intent and declared intent for a fourth, subsequent publication relative to said third publication for said second consumer or second group of consumers.

2. A method in accordance with claim 1, further comprising receiving and incorporating into the first publication editorial content and advertising content related to said at least one intent of said first consumer or first group of consumers; and receiving and incorporating into the second publication editorial content and advertising content related to said at least one intent of said second consumer or second group of consumers.

3. A method in accordance with claim 2, wherein said editorial content and advertising content is automatically arranged by said publication system for the first and second publications of the first consumer or first group of consumers and the second consumer or second group of consumers, respectively.

4. A method in accordance with claim 1, wherein said first publication is built as a custom publication for said first consumer or first group of consumers that includes editorial content and advertising content based upon the intent of said first consumer or first group of consumers.

5. A method in accordance with claim 4, wherein said first and second publications are custom newspapers.

6. A method in accordance with claim 1, wherein such intent is declared intent of the first consumer or first group of consumers and relates to editorial content, interests or categories that are selected by said first consumer or first group of consumers via one or more of a web site, web portal, social media network, mobile application, subscription group and electronic or online avenue.

7. A method in accordance with claim 1, wherein said editorial content relating to said at least one intent of said first consumer or first group of consumers comprises 1-100 percent of the first publication.

8. A method in accordance with claim 1, wherein said editorial content relating to said at least one intent of said first consumer or first group of consumers comprises 10-90 percent of the first publication.

9. A method in accordance with claim 1, wherein said editorial content relating to said at least one intent of said first consumer or first group of consumers comprises 25-75 percent of the first publication.

10. A method in accordance with claim 1, wherein said first publication is repeated for said first consumer or first group of consumers on a periodic basis.

11. A method in accordance with claim 1, wherein said first and second publications are provided in print format.

12. A method in accordance with claim 1, wherein said first and second publications are provided as a digital product.

13. A system for providing a variable data publication, comprising:
    a publication system, having a data connection to at least one news database and at least one consumer database, comprising at least one computer processor configured to:
    from said consumer database, receive data relative to a first consumer or first group of consumers, the data relating to at least one intent of said first consumer or first group of consumers;
    from said news database, receive data including editorial content or advertising relating to said at least one intent of said first consumer or first group of consumers;
    automatically arrange from at least a portion of said news content relating to said at least one intent of said first consumer or first group of consumers and produce a first publication for said first consumer or first group of consumers including at least some of said editorial content or advertising content relating to said intent of said first consumer or first group of consumers, wherein said intent of said first consumer or first group of consumers is implied intend for said first publication for said first consumer or first group of consumers and is a combination of initial implied intent and declared intent for a second, subsequent publication relative to said first publication for said first consumer or first group of consumers;
    from said consumer database, receive data relative to a second consumer or second group of consumers, the data relating to at least one intent of said second consumer or second group of consumers;
    from said news database, receive editorial content or advertising content relating to said at least one intent of said second consumer or second group of consumers; and
    automatically arrange from at least a portion of said editorial content or advertising content relating to said at least one intent of said second consumer or second group of consumers and produce a second printed publication for said second consumer or second group of consumers including at least some of said editorial content or advertising content relating to said intent of said second consumer or second group of consumers, wherein said intent of said second consumer or second group of consumers is implied intend for said third publication for said second consumer or second group of consumers and is a combination of initial implied intent and declared intent for a fourth, subsequent publication relative to said third publication for said second consumer or second group of consumers.

14. A system in accordance with claim 13, wherein said system is further configured to:
    receive and incorporate into the first publication editorial content and advertising content from an advertising database, the content related to said at least one intent of said first consumer or first group of consumers; and
    receive and incorporate into the second publication editorial content and advertising content from an advertising database, the content related to said at least one intent of said second consumer or second group of consumers.

15. A system in accordance with claim 13, wherein said first publication is built as a custom publication for said first consumer or first group of consumers that includes editorial content and advertising content based upon a declared intent of said first consumer or first group of consumers.

16. A system in accordance with claim 15, wherein said first and second publications are custom newspapers.

17. A system in accordance with claim 15, wherein said editorial content and advertising content is automatically arranged by said publication system for the first and second publications of the first consumer or first group of consumers and the second consumer or second group of consumers, respectively.

18. A system in accordance with claim 13, wherein said intent is declared intent of the first consumer or first group of consumers and relates to editorial content, interests or categories that are selected by said first consumer or first group of consumers via one or more of a web site, web portal, social media network, mobile application, subscription group and electronic or online avenue.

19. A system in accordance with claim 13, wherein said editorial content relating to said at least one declared intent of said first consumer or first group of consumers comprises 1-100 percent of the first publication.

20. A system in accordance with claim 13, wherein said editorial content relating to said at least one declared intent of said first consumer or first group of consumers comprises 10-90 percent of the first publication.

21. A system in accordance with claim 13, wherein said editorial content relating to said at least one intent of said first consumer or first group of consumers comprises 25-75 percent of the first publication.

22. A system in accordance with claim 13, wherein said first publication is repeated for said first consumer or first group of consumers on a periodic basis.

23. A system in accordance with claim 13, wherein said publication system provides said first and second publications in print format.

24. A system in accordance with claim 23, wherein said publication is a printed publication, and wherein said system further comprising:
   one or more data storage devices for storing at least consumer data and one or more of news and advertising data;
   a page handling processor for receiving data from said one or more data storage devices and formatting one or more newspaper pages for a newspaper to be printed based on at least the consumer data and one or more of news and advertising data received; and
   a digital printer comprising at least one printhead that spans the width of the newspaper page to be printed and configured to print the formatted newspaper page.

25. The system of claim 24, further comprising a paper web, wherein the at least one printhead spans the width of the portion of the paper web corresponding to a newspaper page print width.

26. The system of claim 25, further comprising an ink dryer arranged to receive the printed paper web and configured to facilitate ink drying.

27. The system of claim 25, further comprising one or more CPUs communicatively coupled to the newspaper printing system.

28. The system of claim 27, wherein at least one CPU is configured to receive consumer preferences and send the consumer preferences to the one or more data storage devices.

29. A system in accordance with claim 23, further comprising:
   providing a continuous paper web to a high-speed digital printer, said digital printer comprising at least one print matrix that spans the width of a newspaper page to be printed;
   printing onto the continuous paper web rows of images that differ from row to row, the row to row printed images comprising a first segment, said first segment provided with editorial content or advertising content corresponding to intent of said first user or group of users;
   printing onto the continuous web a second segment of web rows that differ from row to row, and which differ from the first segment, said second segment provided with editorial content or advertising content corresponding to intent of said second user or group of users;
   slicing the continuous web at least between the first and second segment;
   assembling each sliced segment into a newspaper; and
   dispatching each newspaper to the corresponding user or group of users.

30. A system in accordance with claim 13, wherein said publication system provides said first and second publications as digital media.

* * * * *